United States Patent [19]

Wentworth, Jr.

[11] Patent Number: 5,211,890

[45] Date of Patent: May 18, 1993

[54] CIRCULATORY ION VAPOR GENERATOR AND METHOD

[76] Inventor: Fred A. Wentworth, Jr., R.F.D. 4, 100 Brentwood Rd., Exeter, N.H. 03833

[21] Appl. No.: 919,717

[22] Filed: Jul. 24, 1992

[51] Int. Cl.$^5$ ............................................... B01F 3/04
[52] U.S. Cl. .................................... 261/30; 261/81
[58] Field of Search ........................ 261/30, 81, 77

[56] References Cited

U.S. PATENT DOCUMENTS

| | | | |
|---|---|---|---|
| 3,204,861 | 9/1965 | Brown | 261/30 |
| 3,224,170 | 12/1965 | Iwanaga et al. | 261/77 |
| 3,464,189 | 9/1969 | Mergenthaler | 261/77 |
| 4,014,637 | 3/1977 | Schena | 261/30 |
| 4,952,340 | 8/1990 | Wentworth, Jr. | 261/30 |

Primary Examiner—Tim Miles
Attorney, Agent, or Firm—Hayes, Soloway, Hennessey & Hage

[57] ABSTRACT

The present invention provides an improved ion vapor generator device for producing a quantity of negatively charged ions from a liquid comprising water. The ion vapors generated may be utilized for the enhancement of combustion processes. By supplying ion vapors to a combustion region of a furnace or internal combustion engine, a catalytic reaction is produced that may be used to reduce fuel consumption and undesired exhaust emissions. The negative ion vapor of the invention can also be supplied to an enclosed area occupied by humans to reduce many noxious or otherwise undesirable odors and breathing irritants therein, and to provide a beneficial stimulation of the respiratory system. The ion vapor is generated by imparting controlled disturbance to the surface of a liquid. Also, an amount of the liquid is withdrawn, continuously aerated, and introduced to the vapor space above the liquid.

18 Claims, 2 Drawing Sheets

CIRCULATORY ION VAPOR GENERATOR AND METHOD

BACKGROUND OF THE INVENTION

1. Field of the Invention

The present invention relates generally to ion vapor generation and more specifically to improved devices for generating ion vapors. Particular utility is found for the present invention in the areas of combustion enhancement for furnaces which burn oil, gas, coal, wood, and/or other like fuels, and also for combustion enhancement of internal combustion engines which burn gasoline, diesel, oil, and/or, liquid natural gas, propane, or butane gas or other like fuels, and will be described in connection with such utilities. However, other utilities are also contemplated by the present invention, including, for example, in health fields related to the control infectious air borne contaminants, irritants to breathing, and odors.

2. Brief Description of the Prior Art

The presence of measurable amounts of water vapor is known to have a catalytic effect capable of improving fuel efficiency in various combustion processes, as is described in Van Nostrand's Scientific Encyclopedia, 4th Edition, at page 1501. For many years, bubbling ion vapor generators have been applied successfully to internal combustion engines. During the last several years, various improvements have been made in ion vapor generator technology, particularly in the areas of heating apparatus and related combustion furnace applications. Such applications are described in my earlier U.S. Pat. No. 4,952,340. The precise phenomenology by which water vapor enhances combustion has not been fully understood in the past, nor is it completely understood now. At further puzzle has been that bubbling or agitating a water-including liquid to produce hydroxyl ions (for example as described in my U.S. Pat. No. 4,952,340 and other U.S. Pat. Nos. 3,862,819, 4,016,837, and 4,410,467), has usually further enhanced combustion, notwithstanding the fact that the precise mechanism by which the negative ions are liberated from the liquid, and why bubbling or agitation processes function better than other methods, is unknown. However, many tests (including mass spectrometry, as well as, commercial use of my earlier ion vapor generator described in my '340 patent) have substantiated that hydroxyl ions are produced by generators using such processes, and have demonstrated the beneficial catalytic effects that the presence of negative ion vapor have on the combustion process.

A research report of my earlier ion vapor generator technology is disclosed in Nelson, K. L. et al, "Augmentation of Gas Phase Combustion By Bubbling Combustion Air Through Liquid," *Proceedings Of Alternate Energy Sources For; Hydrocarbon Technology Environment* (Ann Arbor, Mich.) Vol. 6, 1982, pp. 273-289. Confirmation of the benefits to human health, derived from the presence of negative ion vapor in the air, particularly as regards the retarding of the growth of bacteria and resulting infection, is documented in Soyka, Fred et al, *The Ion Effect*, Bantam Books, New York, N.Y., 1977. Additional references confirming the beneficial effects of ion vapors are given in the bibliography of this volume.

SUMMARY OF THE INVENTION

The present invention provides an improved ion vapor generator for producing a quantity of electrically charged negative ions of the type particularly described in my earlier '340 patent. The present invention is directed to increasing the amount of liquid vapor available in the head space of the generator container to carry the charged ions generated by the device. In summary, the improvement of the instant invention comprises provision of air pressure equalization means communicating with the head space above the surface of the liquid contained within the container of the generating device. The improved equalization means according to the instant invention comprises liquid communication means having at least one inlet means positioned beneath the liquid surface and in communication with the liquid itself. The equalization means is capable of introducing aerated liquid taken from the container into the head space so as to increase the amount of liquid vapor available therein to carry the charged ions produced by the generator. Advantageously, the improvement of the instant invention makes it possible to withdraw more ion-enriched vapor from the device.

Other features and advantages of the present invention will becomes apparent as the following Detailed Description proceeds and upon reference to the Drawings, wherein like numerals depict like parts, and in which:

While the present invention will hereinafter be described in connection with various embodiments and methods of use, it will be understood by those skilled in the art that it is not intended to limit the invention to these embodiments. On the contrary, it is intended to cover all such alternatives, modifications, and equivalents as may be included within the spirit and broad scope of the invention as defined only by the appended claims.

DESCRIPTION OF PREFERRED EMBODIMENTS

Figure 1:
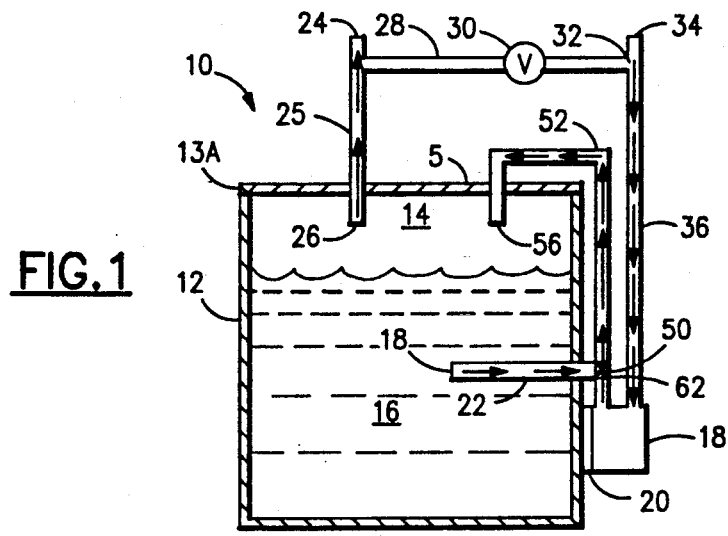
FIG. 1 is a schematic view, in cross-section, of one preferred embodiment of an ion vapor generator device made according to the present invention.

FIG. 1 shows one embodiment of an improved ion vapor generator 10 made in accordance with the present invention. Such an improved generator 10 comprises a liquid tight container 12, preferably having a detachable lid 5 or otherwise removable top, which in this case may be connected to the container 12 by detachable locks, mating grooves, or other connection means 13a, 13b. Preferably, container 12 is made of plastic or glass, and top 5 is made of plastic; however, other substances may be used without departing from the instant invention. Top 5 may take on many forms, and need not have the substantially flat shape shown in FIGS. 1-5. Indeed, without departing from the instant invention, the top may take on a curved shape or any other shape, so long as the outlet means 26 and the air pressure equalization means 56 are able to be inserted through such top to communicate with the interior portion of the enclosure defined by the container 12, and some way is provided to permit the supply of liquid 16 to the interior portion of the container 12. Disposed within and partially filling the container 12 is a water-containing liquid 16, preferably distilled water. The liquid 16 partially fills the container 12 leaving head space volume 14 above the liquid surface 9. This volume 14 is primarily where the negative ion vapors accumulate after liberation from the liquid. In this embodiment, a combination vibrator and recirculation means 18 is mechanically coupled 20 to the side walls of the liquid container 12. The liquid surface 9 is caused to be agitated with a resulting rippling effect as caused by the vibrator unit 18 when in operation. The vibratory level, frequencies, and amplitudes, must be adjusted so as to substantially maintain a continuous surface tension on the liquid surface. This agitation causes negative ions to be released from the liquid 16, out through the liquid surface 9, and into the volume 14. As is disclosed in my previous U.S. Pat. No. 4,952,340, elevated levels of surface agitation may lead to substantial disruption of the surface tension. This phenomenon will (1) significantly limit the effective generation of negative ions and/or (2) cause undesired levels of positive ions to be generated in place of negative ions.

The recirculation portion of the combination unit 18 recirculates the ion vapor in volume 14 by drawing the vapor into outlet means 26 and then piping the vapors into withdrawal means 25. Preferably, the outlet means 26 and the withdrawal means 25 are plastic or glass conduits but they may comprise other hollow structures and/or be made of other materials, so long as the outlet means is positioned to be in communication with the volume 14 above the surface 9 of the liquid 16 within the container 12 and is connected to suitable recirculation means 18. Preferably the recirculation portion of the combination means 18 comprises an air pump to aid in the recirculation of the vapors, in the manner that will be described. An optimal control valve 30 may be provided to control the air flow through conduit 28.

Two openings 24,34 are provided to facilitate withdrawal of ion vapors at 24 while permitting ambient air to be drawn into the conduit 36 at opening 34 so as to substantially maintain a constant pressure within the container 12. The portion of the ion vapors withdrawn through opening 24 may be directed to a desired location (not shown) remote from the generator 10. The vapors thus directed to the desired location may then be used to enhance combustion processes or be put to other uses, as previously discussed. For application of the ion generator invention to odor control in a room or contaminants to breath in, the negative ion flow is directed through ion vapor feeds (not shown) to the area requiring such ion treatment. The vapor encountering the wye 32 near the opening 36 flows into recirculation/vibration means 18.

Figure 2:
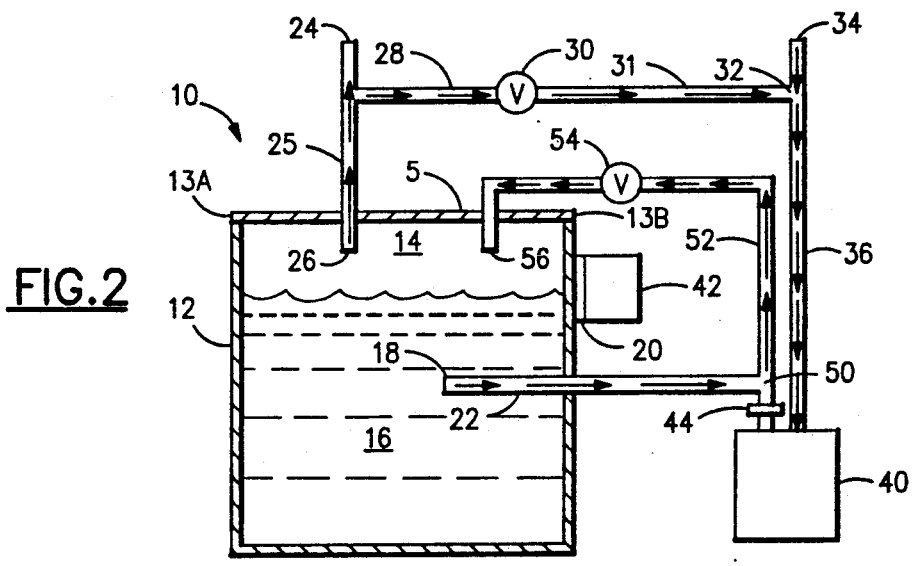
FIG. 2 is a schematic view, in cross-section, of a second embodiment of an ion-vapor generator device made in accordance with the present invention.
Figure 3:
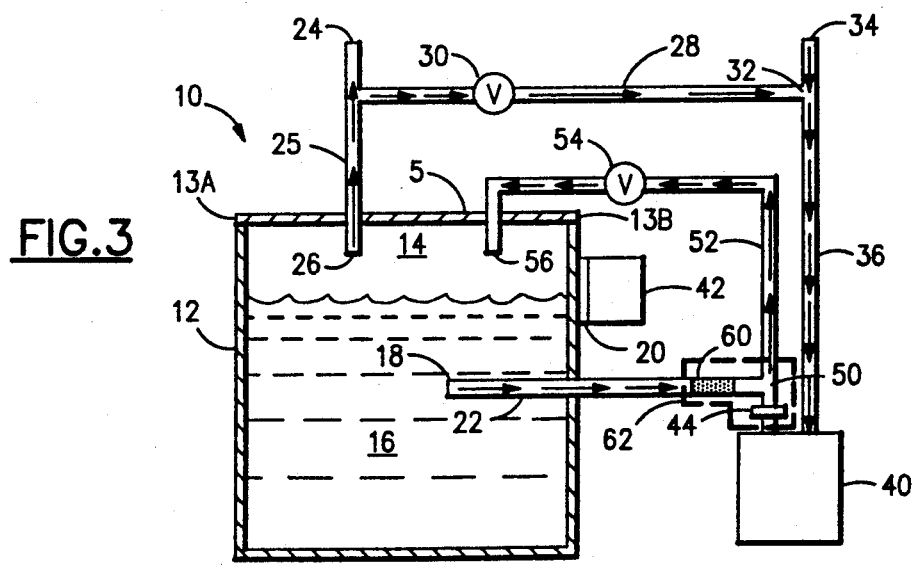
FIG. 3 is a schematic view, in cross section, of a third embodiment of an ion vapor generator device made in accordance with the present invention.

Thence, the air laden with ion vapors is recirculated through the combination means 18 to the second wye 50. Here, a portion of the water-containing liquid 16 is drawn into inlet means 19 of liquid communication means 22. Additional pumping means (not shown) may be used to accomplish the drawing of the liquid into the inlet means but the action of the positive pressure within the equalization means 52 is usually sufficient to perform this task. The liquid thus drawn through the communication means 22 encounters and combines with the recirculated air at wye 50. Suitable water-air separation means 62, which, preferably, may take the form of a one way control valve (as shown in FIGS. 2 and 3) and/or a wad of liquid-absorbant material (for example, a cotton-containing material or the like), may be provided to prevent the backflow of the liquid 16 into the combination unit 18. Advantageously, the mixing of the liquid with the air at the wye 50 permits an increased amount of liquid vapor to be transmitted via the air pressure equalization means 52 and introduced at opening 56 into head space 14. This permits, inter alia, a greater amount of vapor to be present in the head space 14 of the container 12 during generation of the negative ions; ion vapors generated by the generator 10 may then be more easily withdrawn through the vapor withdrawal means 25 at the opening 34 for use in combustion or other processes.

Turning to FIG. 2, in the FIG. 2 embodiment, the agitation means 42 is separated from the recirculation means 40 and is separately secured against a side of the container 12 by coupling means 20. Two separate controllable flow valves 30, 54 are provided to control the flow of vapor through the withdrawal means 25 and the pressure equalization means 52, respectively. Alternatively, the twin vapor flow valves 30, 54 may be replaced with fixed restrictive orafice means (not shown) when controlled adjustment of vapor flow is not required, or either one or both of the control valves may be eliminated. Also in the FIG. 2 embodiment, the separation means 62 comprises a "flapper" or one-way control valve 44 preventing back flow of the liquid into the recirculation pump 40 while permitting the vapor-laden air to flow through the equalization means 52 and into the head space 14 of the container 12. As in the FIG. 1 embodiment, two openings 24, 34 are provided to facilitate withdrawal of ion vapors at 24 while permitting ambient air to be drawn into the conduit 36 at opening 34. Advantageously, in the embodiment shown in FIG. 2, not only does the head space 14 exhibit an increased concentration of liquid vapor but that concentration may be varied by adjusting the flow control valves 30, 54 appropriately, so as to draw desired amounts of ambient air through opening 34 and restrict flow of vapors from head space 14 into opening 26.

A further variation of an ion vapor generator made in accordance with the present invention is shown in FIG. 3. Here, the withdrawal means 25 has substantially the same form as that shown in FIG. 1. However, as in the embodiment shown in FIG. 2, the agitation means 42 and the recirculation pump 40 comprise separate functional units. Additionally, in the FIG. 3 embodiment, the separation means 62 (outlined by dashed lines) comprises both the liquid-absorbant material 60 and the one way flow valve means 44 so as to provide redundant protection against the flow of liquid drawn through the communication means 22 from entering the pump 40.

Figure 4:
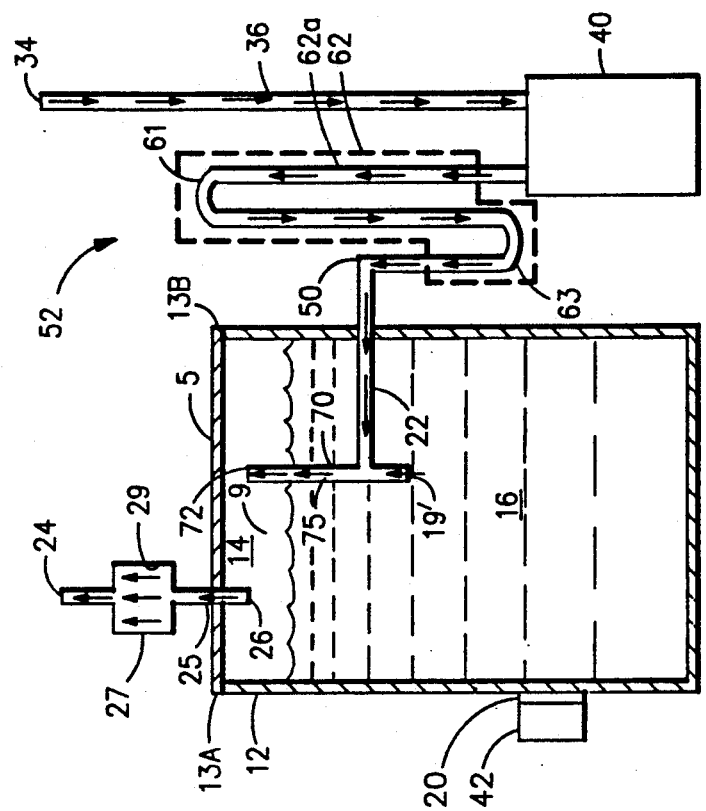
FIG. 4 is a schematic view, in cross-section, of a fourth embodiment of an ion vapor generator device made in accordance with the present invention.

Yet another embodiment of the present invention is shown in FIG. 4, in which three modifications have been made to the equilization means 52. The first of these modifications comprises the addition of a conduit extension 70 in communication with the liquid communication means 22 and the inlet 19. Extension 70 preferably comprises an elongate, vertically oriented pipe positioned at or near a central portion of the container; however, the shape, orientation, and position of the extension 70 in the container may be varied. Extension 70 equalizes the pressure within the space 14 and the communication means by permitting gas to flow into the inlet 19 and out through outlet 72 positioned above the surface 9 of the liquid 16, and thus advantageously eliminates disruption of the surface tension of the liquid that would otherwise result from bubbling action of the liquid.

In the second modification to the equilization means 52, the water-air separation means 62 (outlined by the dashed lines) takes the form of an S-shaped elongated positive pressure conduit 62a having a raised portion 61, positioned so as to be above the water surface level 9, and a lowered portion 63 positioned so as to be below the water line 9. Advantageously, this arrangement generates substantial positive pressure within the separation means 62 which permits air flow from the pump the pump 40 through the wye 50 and into the container at 56 while preventing the flow of water from the conduit means 22 from entering the pump 40. The configuration of the positive pressure conduit 62a may take many forms, so long as, at least one portion 61 is above the water line 9 and a second portion 63 is beneath the water line 9, so as to provide sufficient positive pressure to prevent water entering the conduit 22 from flowing into the pump 40. Also, in order to provide additional positive pressure in the conduit 62a, pumping means (not shown) may be interjected within the conduit line 62a. Lastly, in the third modification, the conduit 28 and valve 30 have been removed from the equalization means 52, thus eliminating the wye 32.

Figure 5:
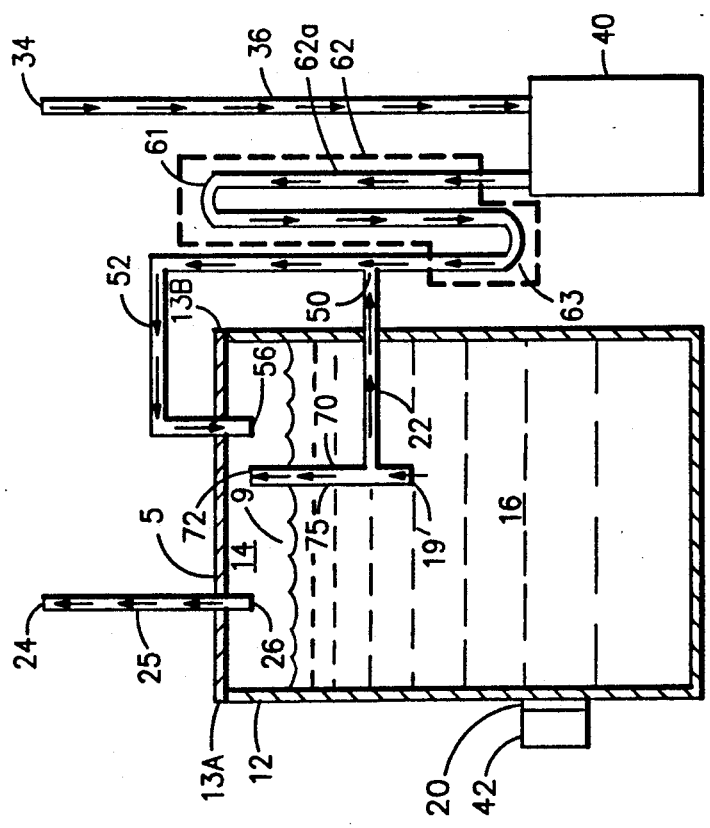
FIG. 5 is a schematic view, in cross-section, of a fifth embodiment of an ion vapor generator device made according to the improvement of the present invention.

FIG. 5 shows a variation of the embodiment depicted in FIG. 4. In the FIG. 5 embodiment the inlet 19' is combined with the extension 70 to form a single elongated conduit unit 75. Unit 75 has an opening 72 in communication with the head space 14 of the generator and is also in communication with the communication means 22. Also, in the embodiment in FIG. 5, the portion of the equalization means 52 having the opening 56 has been eliminated along with the wye 50. This arrangement permits air flow into the communication means 22 (as shown by the direction of the arrows therein). Water entering the communication means by inlet means 19 is aerated by the air and the resulting vapor flows into the head space 14 through outlet 72. Also, in this embodiment, the withdrawal means 25 comprises an interjected expansion chamber 27. As in the other embodiments, withdraw vapor enters the opening 26 of the withdrawal means 25, however in this embodiment, the withdrawn vapor then enters the expansion chamber 27. The vapor expands within the expansion chamber 27 and water carried by the withdrawn vapor condenses along the interior surface of the walls 29 of the expansion chamber 27. Advantageously, the provision of the expansion means in this embodiment of the instant invention, reduces the amount of water vapor present in the withdrawn vapor, thus effectively substantially increasing the concentration and useful lifetime of the ion vapors also present therein. Of course, as will be instantly appreciated by those skilled in the art, although the expansion chamber 27 preferrably has a cylindrical form and a diameter substantially larger than the conduit 25 into which it is interjected, both the size and shape of the expansion chamber 27 are infinitely variable, so long as its size and shape permit expansion of the withdrawn vapor therein so that the carried water vapor is able to condense onto the sides 29 thereof. Further advantageously, the arrangement shown in FIG. 5 offers improved prevention of disruption of the liquid surface tension since bubbles generated at or near the inlet 19' will flow naturally upwards towards the opening 72 and be released into the space 14, due to the substantially vertical orientation of the unit 75.

The capacity required to permit optimum performance of a negative ion vapor generator according to the instant invention is determined by the general combustion process or other requirements of the application to which the generator and vapors are applied, as is known to those skilled in the art, and as is taught in my previous U.S. Pat. No. 4,952,340.

Thus, there has been provided in accordance with the present invention, an improved ion vapor generator device. While the invention has been described in conjunction with specific embodiments thereof, it is evident that many alternatives, modifications, and variations may be made without departing from the spirit or scope of the invention. For example, ions may be generated by controlled rotation of the water-containing liquid using a circulatory pump, magnetic or mechanical stirrer or the like, in accordance with my co-pending application Ser. No. 07/886,757, filed May 21, 1992, the contents of which are incorporated herein by reference. Ions also may be generated by controllably disturbing the liquid surface by bubbling or agitating the water-containing liquid in accordance with the teachings of my aforesaid prior U.S. Pat. Nos. 3,862,819, 4,016,837 and 4,410,467, the contents of which are incorporated by reference. Accordingly, the present invention is intended to embrace all such alternatives, modifications, and variations as may fall within the spirit and broad scope of the appended claims.

What is claimed is:

1. In an ion vapor generator device for producing a quantity of negative electrically charged ions, comprising a container for holding a quantity of a liquid including H$_2$O and including head space for ion vapor within said container and above said liquid surface; outlet means for withdrawing at least a portion of said ion-enriched vapor from said container; and means for imparting controlled disturbance of said liquid surface while maintaining substantially continuous surface tension on the liquid surface; the improvement which comprises air pressure equalization means communicating with said head space and having liquid communication means positioned so as to have at least one inlet means positioned beneath said liquid surface and in communication with said liquid, said equalization means being capable of introducing additional vapor of said liquid to said head space.

2. An improved device according to claim 1, wherein said equalization means comprises air pumping means.

3. An improved device according to claim 1, wherein said withdrawing means comprises air pumping means.

4. An improved device according to claim 1, wherein said communication means comprises an elongate conduit means.

5. An improved device according to claim 1, and further comprising, an expansion chamber interjected into said withdrawal means.

6. An improved device according to claim 1, wherein the improvement further comprises a flow control valve interjected in said air pressure equalization means so as to provide means for controlling the amount of vapor of said liquid introduced into said head space.

7. An improved device according to claim 6, and further comprising a second flow control valve interjected in said outlet means for recirculating a controllable portion of said withdrawn ion vapor back into said container.

8. An improved device according to claim 1, and further comprising, extension means in communication with said communication means and said head space and being for preventing gas bubbles from disrupting said surface tension of said liquid surface.

9. An improved device according to claim 8, wherein said inlet means and said extension means are combined into a single elongated conduit unit in communication with said head space and said communication means.

10. An improved device according to claim 1, and further comprising, recirculation means for continuously cycling some of said vapor into and out of said container.

11. An improved device according to claim 10, and further comprising, a flow control valve interjected in said outlet means for recirculating a controllable portion of said withdrawn ion vapor back into said headspace of said container.

12. An improved device according to claim 10, wherein said vibration means and said recirculation means are functionally combined in one device.

13. An improved device according to claim 2, wherein said equalization means further comprises means for preventing said liquid from flowing from said communication means into said pumping means.

14. An improved device according to claim 13, wherein said flow preventing means comprises an elongate S-shaped conduit means in communication with said communication means and having at least one portion which is above the surface of said liquid and at least one portion which is below the surface of said liquid so as to prevent said liquid entering said communication means from flowing into said pumping means.

15. An improved device according to claim 13, wherein said flow preventing means comprises a wad of liquid absorbent material placed in said communication means.

16. An improved device according to claim 13, wherein said flow prevention means comprises a one-way valve permitting air to pass therethrough while preventing said liquid from passing therethrough.

17. A method for producing an excess over ambient concentrations of negative ions from a container partially filled with a liquid including $H_2O$ and having a space devoid of said liquid at the top of said container, which comprises imparting controlled disturbance of the surface of said liquid while maintaining substantially continuous surface tension on the liquid surface to produce and liberate a net surplus of said negatively charged ions; withdrawing at least a portion of said ion vapor from above said liquid surface in said container and recirculating at least a portion of said withdrawn ion vapor to said container, withdrawing a portion of said vapor enriched with negative ions to a desired location; and wherein the improvement comprises, continuously aerating an amount of said liquid from said container to produce additional vapor and introducing said additional vapor to said space.

18. A method for improved quality of air which comprises treating air with negative ions produced according to the method of claim 17.

* * * * *